United States Patent Office 2,758,982
Patented Aug. 14, 1956

2,758,982
AMIDES AS STABILIZERS FOR POLYSULFONE RESINS

John E. Wicklatz and John F. Howe, Bartlesville, Okla., assignors to Phillips Petroleum Company, a corporation of Delaware No Drawing. Application July 11, 1951, Serial No. 236,276

10 Claims. (Cl. 260—29.2)

This invention relates to heteropolymeric resin compositions formed by the interaction of sulfur dioxide and unsaturated organic compounds capable of reacting with sulfur dioxide. In one aspect this invention relates to a method for producing thermally stable olefin-sulfur dioxide resins. In another aspect this invention relates to incorporating amides in an olefin-sulfur dioxide resin. In still another aspect this invention relates to a polysulfone resin which is resistant to thermal decomposition.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as additives for the olefin-sulfur dioxide resins. These additives include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence.

We have discovered that olefin-sulfur dioxide resins can be rendered resistant to thermal decomposition when an amide is incorporated therein as a stabilizing agent. When added to an olefin-sulfur dioxide resin according to the method of our invention amides impart excellent thermal stability to said resins.

According to this invention there is provided a process for the production of a thermally stable olefin-sulfur dioxide resin which comprises the step of adding an amide to said resin prior to the molding step.

Amides which can be employed in the practice of the present invention include compounds of the formulae

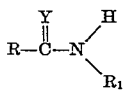

and

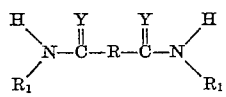

wherein R can be an aliphatic or substituted aliphatic group containing from 1 to 19 carbon atoms, or a cycloaliphatic group containing not to exceed 6 carbon atoms, or an aryl group and the $R_1$'s can be hydrogen, aryl groups, or aliphatic or substituted aliphatic groups containing not to exceed 10 carbon atoms. Total carbon atoms shall not exceed 30. These compounds may contain sulfur or oxygen in the carbonyl groups, e. g., they may be thioamides; Y can be S or O.

In order to effect the desired degree of stabilization from 0.2 to 10, preferably 0.5 to 5 weight per cent based on the weight of the resin of amide is incorporated in the molding composition employed, although amounts outside these ranges will, to the extent added, yield the results of the invention.

The compounds of the present invention may be incorporated in olefin-sulfur dioxide resins in a number of ways, the important factor being that the amide be thoroughly and intimately mixed with the resin. Thus, for example, the stabilization agent may be added to an aqueous dispersion of the resin in which the latter was prepared and both the resin and stabilizer precipitated therefrom simultaneously. An aqueous dispersion of the stabilization agent may also be added to a neutral latex. The stabilizer may be dissolved in methanol, or other suitable solvent and thoroughly admixed with a dry, powdered resin and the solvent subsequently removed by evaporation or other suitable means. The compounds of the present invention are applicable for the stabilization of olefin-sulfur dioxide resins produced by any method such as polymerization in excess sulfur dioxide or acetone or other suitable solvent. When operating with latices, it has usually been preferred to employ resins produced by emulsion polymerization methods, more particularly resins produced by the method disclosed in copending application Serial Number 8,755, filed February 16, 1948, by Willie W. Crouch and Ernest W. Cotten, now Patent No. 2,645,631.

Organic compounds which enter into the formation of heteropolymeric resins as described herein include monoolefins, cyclo-olefins, and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, acrylonitrile, etc. The process comprises reacting the unsaturated compound and sulfur dioxide in aqueous emulsion in the presence of suitable catalysts and emulsifying agents and also bulk polymerization in a homogeneous system comprising olefin, sulfur dioxide and catalyst.

PREPARATION OF A 1-BUTENE-SULFUR DIOXIDE RESIN

An olefin-sulfur dioxide resin was prepared using the following emulsion recipe in a stainless steel autoclave.

| Materials: | Parts by weight |
|---|---|
| Commercial 1-butene [1] | 57.7 |
| Sulfur dioxide | 88.3 |
| Water | 180 |
| Ammonium nitrate | 0.5 |
| Maprofix M M [2] | 0.6 |

[1] The commercial 1-butene had the following composition:

| | Mol percent |
|---|---|
| 1-butene | 63.2 |
| 2-butene-cis | 1.0 |
| 2-butene-trans | 12.5 |
| n-butane | 13.4 |
| Isobutane | 4.6 |
| $C_3$ | 1.0 |
| Isobutylene | 3.6 |
| Butadiene | 0.7 |

[2] Sodium laurylsulfate dispersing agent commercially available in the form of a paste containing about 60 per cent solids.

The polymerization was conducted for a period of 6.5 hours at a temperature of 100° F.

At the end of the reaction period the reactor was opened and excess sulfur dioxide vented therefrom. Samples were removed from this batch of latex or from a latex prepared in this manner as needed for treatment and testing described in the following examples. Coagulation was effected with methanol; the resin was then removed by filtration and dried in air at 130 to 150° F. for 16 hours.

Example I

A series of runs was made wherein solutions of amides in methanol or benzene were added to samples of dry 1-butene-sulfur dioxide resin obtained from a latex prepared according to the procedure described herein. After thoroughly commingling the resin and stabilizer solution, the solvent was removed by evaporation. Resins so treated were tested for thermal stability in the following manner:

Two or three grams of treated resin were placed in a suitable test tube which was then partially immersed in a constant temperature bath held at 325±2° F. for varying periods. Per cent loss in weight of the resin was determined at the end of said selected heating periods. The per cent loss in weight provides a measure of the thermal decomposition which took place. Untreated controls were run simultaneously. Results of the test were recorded in the following table:

|  | Percent loss in weight at end of x hours' heating time | | |
|---|---|---|---|
|  | 0.5 | 1 | 3 |
| Sample I: |  |  |  |
| Control | 5.1 | 7.7 | 15.0 |
| 2% dodecaneamide [1] (methanol solvent) | 2.4 | 3.5 | 6.6 |
| Sample II: |  |  |  |
| Control | 8.1 | 10.8 | 16.6 |
| 2% Armid HT [1] (a mixture of $C_{16}$ and $C_{18}$ amides (benzene solvent)[3] | 0.9 | 2.0 | 4.6 |
| 2% acetamide [1] (methanol solvent) | 1.6 | 2.8 | 5.7 |
| 2% thioacetamide [1] (Methanol solvent) | 0.9 | 1.5 | 3.8 |
| Control [2] (methanol solvent) | 6.5 | 10.6 | 18.3 |
| 2% adipamide [1] (methanol solvent) | 3.4 | 4.5 | 7.5 |

[1] Weight percent based on weight of dry resin.
[2] Latex coagulated with magnesium sulfate.
[3] Commercial stearamide containing at least 70 weight percent octadecane amide, the remainder being substantially hexadecane amide.

PREPARATION OF A 1-PENTENE-SULFUR DIOXIDE RESIN

An olefin-sulfur dioxide resin was prepared using the following emulsion recipe in a stainless steel autoclave.

| Materials: | Parts by weight |
|---|---|
| 1-pentene | 46.7 |
| Sulfur dioxide | 88.3 |
| Maprofix M M [1] | 0.6 |
| Ammonium nitrate | 0.5 |
| Water | 180 |

[1] Sodium laurylsulfate dispersing agent available in the form of a paste containing about 60 percent solids.

Stainless steel autoclave reactor
Temperture, 100° F.
Time, 11 hours
Conversion, 98%

Example II

Thermal stability tests were conducted using samples of the 1-pentene resin as herein prepared. The latex was coagulated with magnesium sulfate and thermal stability tests were conducted as in Example I.

|  | Percent loss in weight at end of x hours' heating time | | |
|---|---|---|---|
|  | 0.5 | 1 | 3 |
| Control | 5.3 | 7.2 | 10.4 |
| 2% Armid HT [1] (a commercial mixture $C_{16}$ and $C_{18}$ amides) | 0.3 | 0.6 | 1.2 |

[1] Weight percent based on weight of dry resin.

The dry resin was mixed with a mehanol solution of the stabilizer and the methanol was then evaporated.

PREPARATION OF A CYCLOHEXENE-SULFUR DIOXIDE RESIN

| Materials: | Parts by weight |
|---|---|
| Cyclohexene | 56.8 |
| Sulfur dioxide | 78.2 |
| Water | 180 |
| Maprofix M M [1] | 1.0 |
| Ammonium nitrate | 0.50 |

[1] Sodium laurylsulfate dispersing agent available in the form of a paste containing about 60 percent solids.

The reaction was carried out at 50° F. for a period of 6 hours. The conversion was 88.7%.

Example III

The resin was prepared from the latex and dried according to the described procedure. (Latex coagulated with methanol.) Results of thermal stability test using Armid HT are recorded in the following table:

|  | Percent loss in weight at end of x hours' heating time 325±2° F. | | |
|---|---|---|---|
|  | 0.5 | 1 | 3 |
| Control | 3.8 | 6.3 | 15.3 |
| 2 weight percent based on dry resin of Armid HT (a commercial mixture of $C_{16}$ and $C_{18}$ amides) | 2.8 | 6.4 | 12.7 |

The dry resin was mixed with a methanol solution of the stabilizer and the methanol was then evaporated.

The results of tests, as indicated by the examples set out herein, demonstrate that the amides of this invention render olefin-sulfur dioxide resins resistant to thermal decomposition.

Reasonable variation and modification are possible within the scope of the foregoing disclosure and the appended claims to the invention the essence of which is that the addition of an amide to an olefin-sulfur dioxide resin results in the production of a thermally stable resin and that such a resin has been produced.

We claim:

1. The composition of claim 2 wherein the mono-olefin is selected from the group consisting of (1) 1-butene and (2) cyclohexene and (3) 1-pentene.

2. A mono-olefin-sulfur dioxide polysulfone resin stabilized with an amide selected from the group consisting of amides represented by the formulas

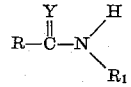

and

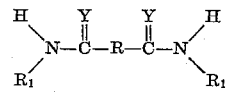

wherein R is selected from the group consisting of an aliphatic group containing from 1 to 19 carbon atoms, a cycloaliphatic group containing not more than 6 carbon atoms and an aryl group; and wherein each $R_1$ is selected from the group consisting of hydrogen, aryl groups containing not more than 10 carbon atoms, and aliphatic groups containing not more than 10 carbon atoms; total carbon atoms per molecule shall not exceed 30; and Y is selected from the group consisting of oxygen and sulfur.

3. The composition of claim 2 wherein the amide is adipamide.

4. The composition of claim 2 wherein the amide is dodecaneamide.

5. The composition of claim 2 wherein the amide is acetamide.

6. The composition of claim 2 wherein the amide is thioacetamide.

7. The composition of claim 2 wherein the mono-olefin is an open chain mono-olefin.

8. The composition of claim 2 wherein the mono-olefin is a mono-cyclic mono-olefin.

9. The composition of claim 2 wherein the amide is commercial stearamide containing at least 70 weight per cent octadecane amide.

10. A mono-olefin-sulfur dioxide polysulfone resin latex and an amide selected from the group consisting of amides represented by the formulas

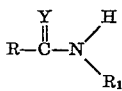

and

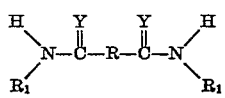

wherein R is selected from the group consisting of an aliphatic group containing from 1 to 19 carbon atoms, a cycloaliphatic group containing not more than 6 carbon atoms, and an aryl group; and wherein each $R_1$ is selected from the group consisting of hydrogen, aryl groups containing not more than 10 carbon atoms, and aliphatic groups containing not more than 10 carbon atoms; total carbon atoms per molecule shall not exceed 30; and Y is selected from the group consisting of oxygen and sulfur.

References Cited in the file of this patent

UNITED STATES PATENTS

| | | |
|---|---|---|
| 2,510,882 | Giraitis et al. | June 6, 1950 |
| 2,578,653 | Goppel et al. | Dec. 18, 1951 |

FOREIGN PATENTS

| | | |
|---|---|---|
| 969,154 | France | May 17, 1950 |